United States Patent Office 3,457,253
Patented July 22, 1969

3,457,253
5′,5′-DI-(ARA)-NUCLEOSIDE PHOSPHATES
William J. Wechter, Kalamazoo, Mich., assignor to The Upjohn Company, Kalamazoo, Mich., a corporation of Delaware
No Drawing. Filed June 1, 1965, Ser. No. 460,552
Int. Cl. A61k *27/00;* C07d *51/50*
U.S. Cl. 260—211.5                5 Claims The present invention is concerned with novel compounds and, more particularly, 5′,5′-dinucleoside phosphates in which both sugar moieties are β-D-arabinofuranosyl moieties and at least one nucleoside moiety is 1-β-D-arabinofuranosylcytosin-5′-yl, the pharmaceutically acceptable salts thereof, and a process for the preparation thereof.

The novel compounds and the generic process can be illustratively represented by the following sequence of formulae:

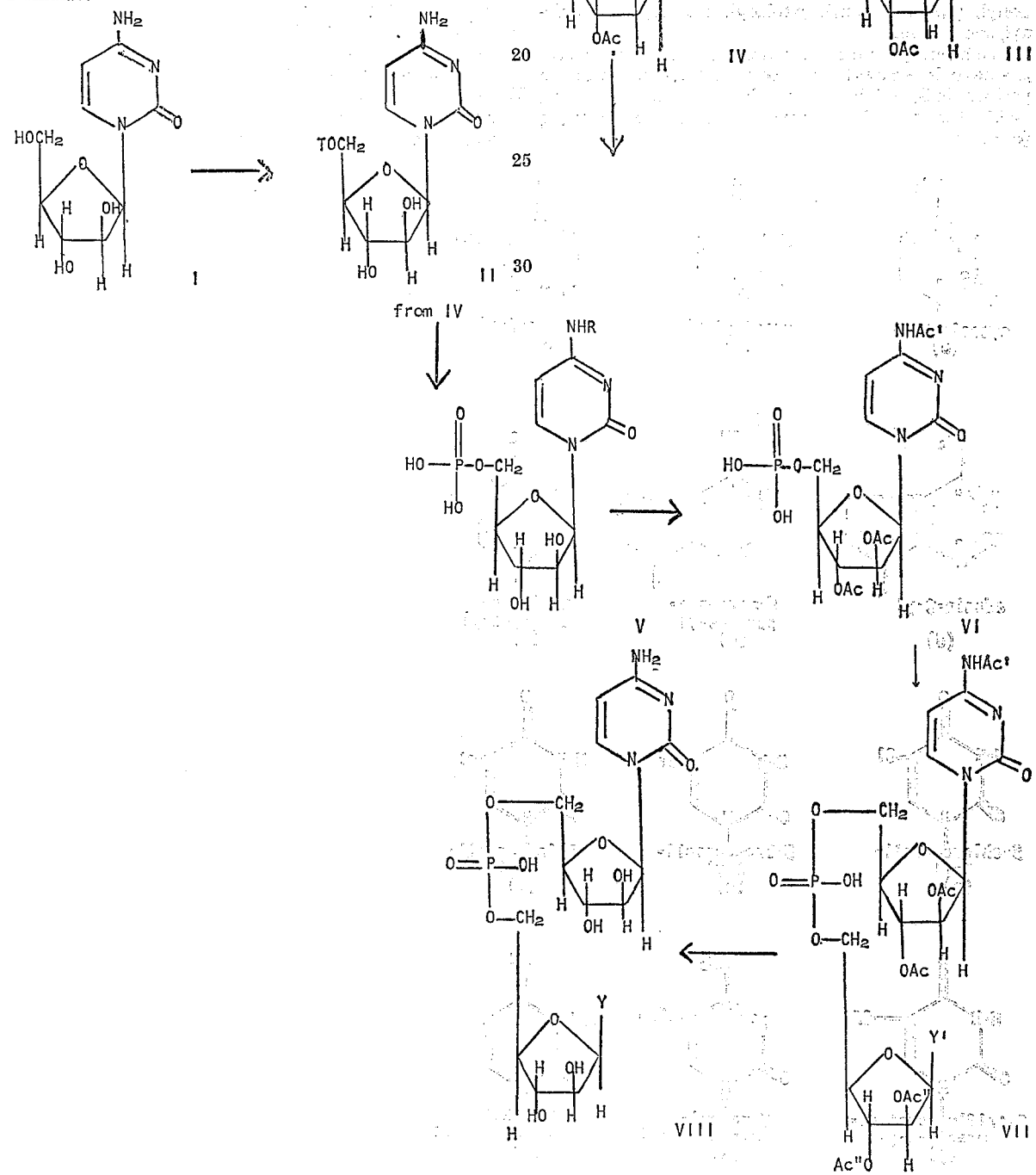

wherein Ac, Ac' and Ac'' are selected from the group consisting of acyl radicals of hydrocarbon carboxylic acids containing from 2 to 12 carbon atoms, inclusive, and anisoyl, wherein R is selected from the group consisting of hydrogen and acyl defined as herein above, wherein T is selected from the group consisting of triphenylmethyl, (p - methoxyphenyl)diphenylmethyl and bis(p-methoxyphenyl)phenylmethyl, wherein Y is selected from the group consisting of cytosin-1-yl, uracil-1-yl, thymin-1-yl (alternatively, 5-methyluracil-1-yl), adenin-9-yl (alternatively, 6-aminopurin-9-yl), 6-mercaptopurin-9-yl, 5-fluorouracil-1-yl, 5-chlorouracil-1-yl, 5-bromouracil-1-yl, 5-iodouracil-1-yl, 3-methylcytosin-1-yl, 5-methylcytosin-1-yl and 5-trifluoromethyluracil-1-yl, and wherein Y' is defined as Y in which amino groups are protected by an acyl group defined as hereinabove.

Examples of acyl radicals of hydrocarbon carboxylic acids, as herein used, include acetyl, propionyl, butyryl, valeryl, isovaleryl, hexanoyl, heptanoyl, octanoyl, nonanoyl, decanoyl, undecanoyl, lauroyl, benzoyl, phenylacetyl, phenylpropionyl, p-toluoyl, β-cyclopentylpropionyl, and the like.

The heterocyclic radicals Y are obtained when a hydrogen atom is removed from the parent compound at the position indicated by the number prior to the ending "-yl." The radicals Y have therefore the following formulae:

The above uracil radical (b) and the substituted radicals (c), (f), (g), (h), (i), (j) (k) and (l) are written in the keto form, rather than in the tautomeric enol form. Likewise, other of the above radicals can be written in tautomeric form. For example, the cystosine radical (a) is written in the amino form, but it can also be written in the tautomeric imino form. In chemical compounds, e.g., the compounds of this invention, such forms may frequently be present in an equilibrium mixture.

The process of the present invention is essentially designed to protect those groups in the nitrogenous heterocyclic moiety as well as in the sugar moiety of the molecule which can react with phosphoric acid or the phosphorylating agent and leave at the same time the desired hydroxy group at position 5', that is, the only primary alcoholic group in the sugar moiety, open to react with the phosphorylating agent. While the process can therefore slightly vary, depending on the selected nucleoside and protecting agent, the basic process can be described as shown in the before-disclosed sequence of formulae, in the following manner:

1-β-D-arabinofuranosylcytosine (I) as the free base or as a salt of a mineral acid such as hydrochloric acid is etherified at the 5' position, for example, with triphenylchloromethane, to give 1-(5'-triphenylmethyl-β-D-arabinofuranosyl)cytosine (II). Compound II is thereupon reacted with an acylating agent selected from the group consist-

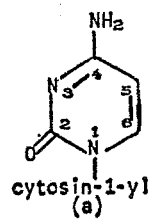
cytosin-1-yl
(a)

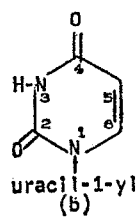
uracil-1-yl
(b)

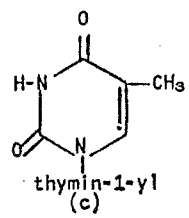
thymin-1-yl
(c)

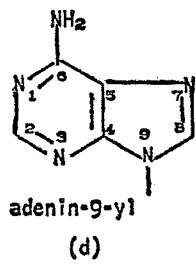
adenin-9-yl
(d)

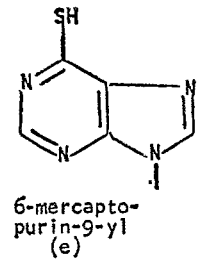
6-mercapto-
purin-9-yl
(e)

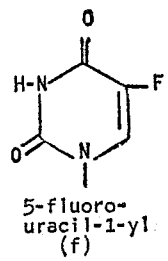
5-fluoro-
uracil-1-yl
(f)

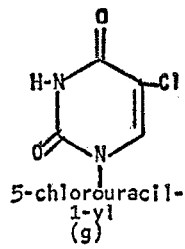
5-chlorouracil-
1-yl
(g)

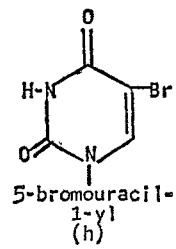
5-bromouracil-
1-yl
(h)

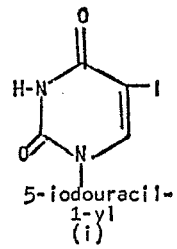
5-iodouracil-
1-yl
(i)

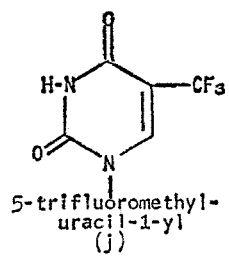
5-trifluoromethyl-
uracil-1-yl
(j)

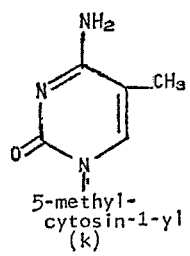
5-methyl-
cytosin-1-yl
(k)

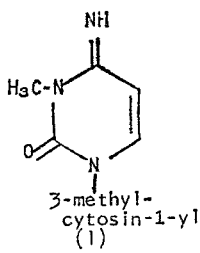
3-methyl-
cytosin-1-yl
(l)

ing of acid anhydrides and acid halides of hydrocarbon carboxylic acids containing from 2 to 12 carbon atoms, inclusive, such as acetic anhydride, propionic anhydride, benzoyl chloride, and the like, to produce acylation on the hydroxy groups 2' and 3' and on the amino group of the cytosine moiety, thus furnishing the product $N^4$-acyl-1 - (2',3'-di-O-acyl-5'-O-triphenylmethyl - β - D-arabinofuranosyl)cytosine (III). This product (III) without further purification is subjected to ether cleavage to give the corresponding $N^4$-acyl-1-(2',3'-di-O-acyl - β - D - arabinofuranosyl)cytosine (IV). Compound IV is thereupon treated with a selected phosphorylating agent, for example, 2-cyanoethyl phosphate in the presence of a selected condensing agent such as dicyclohexylcarbodiimide, and subsequently with an alkali base such as dilute aqueous lithium hydroxide, to give a 1-β-D-arabinofuranosylcytosine-5'-phosphate (V). If the reaction with alkali base is carried out under vigorous conditions, e.g., 1 M lithium hydroxide and a temperature of 75°–100° C., the acyl group at $N^4$ is removed, at lower temperatures, below 25° C., short reaction time, e.g., 30 minutes or less, the acyl group on $N^4$ remains, and only the acyl groups at 2' and 3' are removed. Compound V is thereupon reacylated to give the corresponding $N^4$-acyl-1-(2',3'-di-O-acyl-β-D-arabinofuranosyl)cytosine 5'-phosphate of Formula VI. To obtain an acylated 5',5'-dinucleoside phosphate of Formula VII, compound VI is thereupon condensed with a β-D-arabinofuranosyl nucleoside which is obtained when an arabinoside of the Formula IX below:

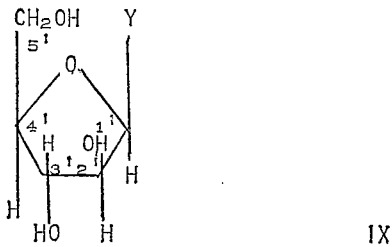

is protected in such a manner that only the 5'-hydroxy group is free to react with the compound of Formula VI. In Formula IX the parameter Y is defined as hereinabove, and the protection of the 2' and 3' hydroxy groups of the sugar moiety and of any amino groups possibly present in Y can be obtained by acylation in the stepwise manner shown in the prior process I→II→III→IV.

The β-D-arabinofuranosyl nucleoside reactants are, therefore, selected from the group consisting of compounds represented by the formulae:

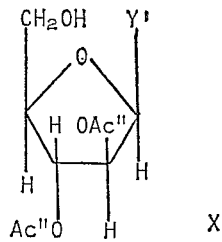

wherein Ac" and Y' have the same definition as hereinabove.

Alternatively, compounds of Formula VII can be produced by condensing an $N^4$-acyl - 1-(2',3'-di-O-acyl-β-D-arabinofuranosyl)-cytosine (IV) with a 5'-phosphate of compound X. Such 5'-phosphates are prepared by treating compounds of Formula X with a phosphorylating agent, condensing agent and an alkali base, as shown in the conversion of compound IV to V.

The compounds of Formula VII are then hydrolyzed, for example, by treatment with methanolic or ethanolic ammonia, to give the 1-(β-D-arabinofuranosyl)cytosin-5'-yl 1-(β-D-arabinofuranosyl)-Y-substituted 5'-yl phosphate VIII.

The novel oligonucleotides of Formula VIII exhibit significant cytotoxic activity in vitro, particularly against KB tumor cells, and against viruses, particularly the different types of Herpes, Coe, and vaccinia viruses. For this reason, the products can be employed for cleansing glassware and instruments used in the growing of tissue cultures in virus and tumor research, and for washing excised tumor tissue intended for transplant into animals, to inhibit the growth of any KB tumor cells that might otherwise seed surrounding tissues or be transported to other parts of the animal body. The antiviral activity can also be used to prepare clean cultures of microorganisms, free of viral phages, e.g., phage-free, antibiotic-producing Streptomyces cultures. Compounds of Formula VIII cured Herpes keratitis in the eye of virus-infected domestic animals.

The starting material, 1-β-D-arabinofuranosylcytosine, and the compounds indicated by Formula IX are generally known in the art (see e.g., Michaelson, The Chemistry of Nucleosides and Nucleotides, Academic Press, London and New York, 1963).

In carrying out the process of the present invention, 1-β-D-arabinofuranosylcytosine (I) as hydrochloride, hydrobromide or other salt, or as free base, is treated with an etherifying agent in a basic organic solvent. As etherifying agent, triphenylchloromethane, triphenylbromethane, (p - methoxyphenyl)diphenylchloro(or bromo)methane and bis(p-methoxyphenyl)-phenylchloro(or bromo)methane, are generally employed. As an organic base, triethylamine, pyridine, alkylpyridines, e.g., picolines, lutidines, ethylpyridines, diethylpyridines, and the like can be used, with pyridine preferred. The reaction can be carried out at a temperature between 0 and 60° C. and is preferably carried out at room temperature, between 20 and 30° C. The reaction time at room temperature is between 6 hours and 10 days. In the preferred embodiment of this invention, the 1-β-D-arabinofuranosylcytosine is stirred in pyridine solution with triphenylchloromethane, (p-methoxyphenyl)diphenylchloromethane, or bis(p-methoxyphenyl)-phenylchloromethane, or the bromo analogues thereof, for a period of 6 hours to 10 days. Thereafter, the product is isolated by conventional means, such as pouring the mixture into water and separating the product after it has crystallized. The product can be purified by conventional means, such as recrystallization, for example from acetone.

The acylation of the thus-obtained product, a 1-(5'-O-triphenylmethyl-β-D-arabinofuranosyl)cytosine, is carried out with an acylating agent selected from the group consisting of acyl chlorides, acyl bromides, and acid anhydrides of hydrocarbon carboxylic acids having from 2 to 12 carbon atoms, inclusive, and anisoyl chloride or bromide. Illustrative acyl chlorides and acyl halides include acetyl chloride, acetyl bromide, benzoyl chloride, anisoyl chloride, para-ethylbenzoyl chloride, para-methylbenzoyl bromide, β-cyclopentylpropionyl chloride, lauroyl chloride, decanoyl chloride, octanoyl bromide, and the like. Illustrative acid anhydrides include acetic anhydride, propionic anhydride, butyric anhydride, valeric anhydride, phenylacetic anhydride, phenylpropionic anhydride, hexanoic anhydride, and the like. In the preferred embodiment of this invention, the acylation reaction is carried out in dry pyridine at room temperature, between 20 and 30° C., under continuous stirring for a period of 1 to 48 hours. After this period the material is recovered by standard procedures such as pouring the pyridine solution into water, decanting the water, and purifying the remaining material by conventional means such as chromatography, extraction, recrystallization, or a combination of these methods, and the like. The thus-obtained $N^4$-acyl-1-(2',4'-di - O - acyl-5'-O-triphenylmethyl-β-D-arabinofuranosyl)-cytosine is then subjected to ether cleavage, for example, with acetic acid or with acetic acid containing a hydrogen halide, e.g., hydrogen chloride, hydrogen bromide or hydrogen iodide, to give the corresponding N⁴-acyl-1-(2′,3′-di-O-acyl-β-D-arabinofuranosyl)cytosine.

The same method (i.e., etherification, acylation and ether cleavage) is used to protect groups capable of reacting with the phosphorylating agent in the arabinosides of Formula IX.

The phosphorylation of the protected N⁴-acyl-1-(2′,3′-di-O-acyl-β-D-arabinofuranosyl)cytosine is carried out by the method of G. M. Tener, J. Am. Chem. Soc. 83,159 (1959). Solvents used in this procedure are anhydrous, non-hydroxylic solvents in which the phosphorylating agent, a phosphate ester, is also soluble. Such solvents include pyridine, picolines, lutidines, and the like. Neutral solvents such as dimethyl sulfoxide, tetrahydrofuran, N,N-dimethylacetamide or dioxane can be used, providing that for each mole of phosphorylating agent one equivalent of base is added. Representative bases for this reaction include pyridine, picolines, lutidines, and trialkylamines.

Phosphate esters, which are readily cleaved by an alkali base, are employed, and particularly useful for this reaction are 2-substituted-ethyl phosphates of the formula:

$$Z-CH-CH_2-O-\overset{O}{\underset{OH}{P}}-OH$$
$$\phantom{Z-}R'$$

wherein R′ is selected from the group consisting of hydrogen and lower-alkyl, wherein Z is a strongly electronegative substituent selected from the group consisting of —C≡N; —SO₂R″;

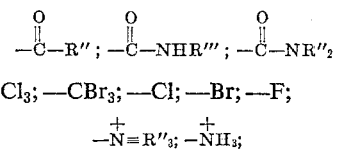

—CF₃; —CCl₃; —CBr₃; —Cl; —Br; —F;

$$-\overset{+}{N}=R''_3; -\overset{+}{N}H_3;$$

—IO₂; —COOR″; —NO₂ and the like; wherein R″ is selected from the group consisting of lower-alkyl and aryl; and wherein R‴ is selected from the group consisting of hydrogen, lower-alkyl and aryl. The preferred 2-substituted-ethyl dihydrogen phosphate is 2-cyanoethyl dihydrogen phosphate.

Instead of a 2-substituted-ethyl dihydrogen phosphate, other dihydrogen phosphate esters which are easily cleaved by an alkali base may be used, for example, o- and p-substituted-phenyl dihydrogen phosphates, such as o- and p-carboxyphenyl dihydrogen phosphate, o- and p-carbamoylphenyl dihydrogen phosphate, and o- and p-cyanophenyl dihydrogen phosphate.

In the solution containing the 2-substituted-ethyl dihydrogen phosphate or o- or p-substituted-phenyl dihydrogen phosphate, the before-mentioned acyl-protected 1-β-D-arabinofuranosylcytosine is dissolved, if necessary under application of heating between 30 and 50° C. After all the N⁴ - acyl - 1 - (2′,3′ - di - O - acyl - β-D-arabinofuranosyl)cytosine is dissolved, a condensing agent is added such as an alkyl-, cycloalkyl- or aryl-substituted carbodiimide, preferably dicyclohexylcarbodiimide. Other compounds unrelated to carbodiimides which can be used as condensing agents are p-toluenesulfonyl chloride, methoxyacetylene, keteneimines, trichloroacetonitrile, substituted cyanamides, α-substituted acetonitriles, alkyl and aryl isocyanates, carboxylic acid chlorides, aralkyl chlorocarbonates and the like.

The preferred temperatures for this reaction are those temperatures around and slightly above room temperature, that is, temperatures between 20 and 40° C.; however, the reaction can be carried out at lower temperatures, such as 5° C., and up to temperatures of about 75° C. without undue side reactions. At a temperature between 20° and 40° C. and at reasonable concentration, the time required for the reaction to be completed is about 6 to 24 hours. However, reaction times between 1 hour and 8 days can be used; the reaction time should be significantly prolonged at greater dilution.

The concentration of the reactants is not critical. Equimolecule amounts of N⁴-acyl-1-(2′,3′,-di-O-acyl-β-D-arabinofuranosyl)cytosine, the 2-substituted-ethyl dihydrogen phosphate and the condensing agent give approximately quantitative conversion, if sufficient time is allowed for the reaction to be completed. In order to shorten the reaction time, a 3 to 4 times molar excess of the 2-substituted-ethyl phosphate over N⁴-acyl-1-(2′,3′-di-O-acyl-β-D-arabinofuranosyl)cytosine is preferred. After the reaction is terminated, a small amount of water is added to inactivate the excess phosphorylating agent and the excess of condensing agent. The solution is then filtered to remove insoluble material such as the disubstituted ureas resulting from the reaction of carbodiimides with water, and the filtrate is used for the next step, the hydrolytic cleavage reaction.

The solution obtained from the prior step is reacted with an alkali hydroxide solution to produce the desired hydrolysis. In the preferred embodiment of the invention, the solution containing the N⁴-acyl-1-(2′,3′-di-O-acyl-β-D-arabinofuranosyl)cytosine-5′-yl 2-cyanoethyl phosphate is first concentrated until a small volume is obtained, concentration preferably being achieved under vacuum. When the volume is low enough so that the cooled material becomes a viscous residue, a base, e.g., aqueous lithium, sodium or potassium hydroxide of a 0.4 to 2 normality, is added until the pH of the solution rises to between 12 and 13. This reaction is carried out at temperatures between 0° C. and the boiling point of the aqueous solution, for a period of between about 10 minutes to 24 hours. After termination of the reaction, the mixture is cooled and filtered. From the filtrate the product V is recovered by conventional methods such as extraction, evaporation, precipitation in the form of insoluble phosphate salts, absorption and desorption on resins, recrystallization and the like.

Depending on the reaction conditions, a 1-β-D-arabinofuranosylcytosine 5′-phosphate is obtained with the acyl group on N⁴ remaining or eliminated. At low temperatures, e.g., below 25° C., and short reaction periods, e.g., 30 minutes or less, the acyl group on N⁴ will remain. If the alkaline solution containing the organic cyanophosphate is kept at higher temperatures, e.g., between 75–100° C., or for long periods at low temperatures the acyl group on N⁴ is removed.

The thus-obtained 1-β-D-arabinofuranosylcytosine 5′-phosphate or its N⁴-acyl derivative is reacylated in the same manner as compound II, preferably in anhydrous pyridine with an acylating agent selected from the group consisting of anhydrides and halides of hydrocarbon carboxylic acids containing from 2 to 12 carbon atoms, inclusive, and anisoyl chloride, to give the N⁴-acyl-1-(2′,3′-di-O-acyl-β-D-arabinofuranosyl)cytosine 5′ - phosphate (VI).

The thus-obtained product VI is thereupon condensed with an arabinofuranoside of Formula X. In the preferred embodiment of this invention, the condensation is carried out with an equimolecular amount of N⁴-acyl-1-(2′,3′-di-O-acyl-β-D-arabinofuranosyl)cytosine 5′-phosphate and the selected arabinoside of Formula X in anhydrous pyridine in the presence of a carbodiimide, e.g., dicyclohexylcarbodiimide, at room temperature, 20–30° C. Instead of pyridine as solvent, alkyl-substituted pyridines such as picolines, lutidines, etc., as well as dimethylformamide, diethylformamide, and the like can be used. The reaction can be carried out at temperatures between 0 and 60° C., but room temperature between 20 and 30° C. is preferred. At room temperatures, the reaction period is between 1 and 10 days, usually between 4 and 8 days. At the termination of the reaction, water is added and the thus-produced disubstituted urea compound is removed from the reaction mixture by filtration. The product, an acylated dinucleoside phosphate (VII), is isolated by conventional methods, illustratively by extracting impurities with a water-immiscible solvent, e.g., petroleum ether, benzene, Skellysolve hexanes, carbon tetrachloride, methylene chloride, ether and the like, and lyophilizing the remaining aqueous mixture. Extraction and lyophilization is often repeated to rid the aqueous mixture of all volatile by-products. After isolation, the product VII can be further purified by conventional methods, e.g., by recrystallization, chromatography, electrophoresis, and the like.

The thus-obtained ester product VII is then treated with anhydrous ammoniacal methanol or other non-aqueous base to hydrolytically remove the acyl groups and to give the dinucleoside phosphate VIII in which at least one of the nucleoside moieties is 1-$\beta$-D-arabinofuranosylcytosin-5'-yl and the other is the same or another N-heterocyclic arabinoside.

In this hydrolysis, part of the cytosine moiety may lose the acylamino group so as to give a uracil mononucleoside phosphate.

Product VIII is then isolated and purified by methods similar to those used for product VII.

The following examples are illustrative of the products and process of the present invention but are not to be construed as limiting.

EXAMPLE 1

1-(5'-O-triphenylmethyl-$\beta$-D-arabinofuranosyl) cytosine

To a solution of 10 g. of 1-$\beta$-D-arabinofuranosylcytosine hydrochloride in 200 ml. of pyridine was added 12 g. of triphenylchloromethane. The reaction mixture was thereupon stirred at room temperature (23–26° C.) for 1 week. The reaction mixture was then poured with stirring into 3 l. of ice water, whereupon 1-(5'-O-triphenylmethyl-$\beta$-D-arabinofuranosyl)cytosine separated as an oil. The oil crystallized on standing with water overnight, and the crystals were recovered by filtration, then broken up, washed thoroughly with water and air-dried. The thus-obtained solid was triturated with 200 ml. of boiling heptane and the mixture filtered, collecting the crystals on a sintered glass funnel. The crystals were again washed with two 150-ml. portions of boiling heptane and, after having been dried, were transferred into 1 l. of boiling acetone containing 1 g. of activated charcoal (Darco G–60). The hot suspension was filtered to remove the charcoal and the filtrate was distilled on a steam bath to a volume of about 75 ml. which was allowed to cool to room temperature, thereby giving a crystalline product. The crystalline product was collected on a sintered glass funnel and washed with 25 ml. of ice-cold acetone. The product was thereupon dried, giving 13 g. of 1-(5'-O-triphenylmethyl-$\beta$-D-arabinofuranosyl)cytosine of melting point 227.5–228° C. with decomposition.

*Analysis.*—Calcd. for $C_{28}H_{27}N_3O_5$: C, 69.26; H, 5.61; N, 8.86. Found: C, 69.09; H, 5.67; N, 8.93.

In the same manner, 1-[5'-O-(p-methoxyphenyl)diphenylmethyl-$\beta$-D-arabinofuranosyl]cytosine or 1-[5'-O-bis(p - methoxyphenyl)phenylmethyl-$\beta$-D-arabinofuranosyl]cytosine can be obtained by reacting 1-$\beta$-D-arabinofuranosyl cytosine or its hydrochloride in pyridine solution with (p-methoxyphenyl)diphenylchloromethane or bis(p-methoxyphenyl)phenylchloromethane at a temperature between 0 and 60° C. under continuous stirring.

Similarly to Example 1, instead of tripenylchloromethane, triphenylbromomethane can be used to give the same final product, 1-(5'-O-triphenylmethyl-$\beta$-D-arabinofuranosyl)cytosine.

EXAMPLE 2

1-(5'-O-triphenylmethyl-$\beta$-D-arabinofuranoyl) uracil

In the manner given in Example 1, 1-$\beta$-D-arabinofuranosyluracil was reacted with triphenylchloromethane in pyridine to give 1-(5'-O-triphenylmethyl-$\beta$-D-arabinofuranosyl)uracil.

EXAMPLE 3

1-(5'-O-triphenylmethyl-$\beta$-D-arabinofuranosyl) thymine

In the manner given in Example 1, 1-$\beta$-D-arabinofuranosylthymine was reacted with triphenylchloromethane in pyridine to give 1-(5'-O-triphenylmethyl-$\beta$-D-arabinofuranosyl)thymine.

EXAMPLE 4

9-[5'-O-(p-methoxyphenyl)diphenylmethyl-$\beta$-D-adenine

In the manner given in Example 1, 9-$\beta$-D-arabinofuranosyladenine was reacted with triphenylbromomethane in pyridine to give 9-(5'-O-triphenylmethyl-$\beta$-D-arabinofuranosyl)adenine.

EXAMPLE 5

9-[5'-O-(p-methoxyphenyl)diphenylmethyl-$\beta$-D-arabinofuranosyl]adenine

In the manner given in Example 1, 9-$\beta$-D-arabinofuranosyladenine was reacted with (p-methoxyphenyl)diphenylchloromethane in pyridine to give 9-[5'-O-(p-methoxyphenyl)diphenylmethyl - $\beta$ - D-arabinofuranosyl]adenine.

EXAMPLE 6

9-(5'-O-triphenylmethyl-$\beta$-D-arabinofuranosyl) 6-mercaptopurine

In the manner given in Example 1, 9-$\beta$-D-arabinofuranosyl-6-mercaptopurine was reacted with triphenylchloromethane in pyridine to give 9-(5'-O-triphenylmethyl-$\beta$-D-arabinofuranosyl)6-mercaptopurine.

EXAMPLE 7

1-(5'-O-triphenylmethyl-$\beta$-D-arabinofuranosyl) 5-chlorouracil

In the manner given in Example 1, 1-$\beta$-D-arabinofuranosyl-5-chlorouracil was reacted with triphenylchloromethane in pyridine to give 1-(5'-O-triphenylmethyl-$\beta$-D-arabinofuranosyl)5-chlorouracil.

EXAMPLE 8

1-(5'-O-triphenylmethyl-$\beta$-D-arabinofuranosyl) 5-fluorouracil

In the manner given in Example 1, 1-$\beta$-D-arabinofuranosyl-5-fluorouracil was reacted with triphenylchloromethane in pyridine to give 1-(5'-O-triphenylmethyl-$\beta$-D-arabinofuranosyl)5-fluorouracil.

EXAMPLE 9

1-(5'-O-triphenylmethyl-$\beta$-D-arabinofuranosyl) 5-trifluoromethyluracil

In the manner given in Example 1, 1-$\beta$-D-arabinofuranosyl-5-trifluoromethyluracil was reacted with triphenylchloromethane in pyridine to give 1-(5'-O-triphenylmethyl-$\beta$-D-arabinofuranosyl)-5-trifluoromethyluracil.

EXAMPLE 10

1-(5'-O-triphenylmethyl-$\beta$-D-arabinofuranosyl) 5-bromouracil

In the manner given in Example 1, 1-$\beta$-D-arabinofuranosyl - 5 - bromouracil was reacted with triphenylchloromethane in pyridine to give 1-(5'-O-triphenylmethyl-$\beta$-D-arabinofuranosyl)5-bromouracil.

EXAMPLE 11

1-(5'-O-triphenylmethyl-$\beta$-D-arabinofuranosyl) 5-iodouracil

In the manner given in Example 1, 1-$\beta$-D-arabinofuranosyl-5-iodouracil was reacted with triphenylchloromethane in pyridine to give 1-(5'-O-triphenylmethyl-β-D-arabinofuranosyl) 5-iodouracil.

EXAMPLE 12

N⁴-benzoyl-1-(2',4'-di-O-benzoyl-β-D-arabinofuranosyl) cytosine

A mixture of 6.2 g. of 1-(5'-O-triphenylmethyl-β-D-arabinofuranosyl)cytosine, 40 ml. of dry pyridine, and 6 ml. of benzoyl chloride was stirred at room temperature (24–26° C.) for 20 hours. The thus-obtained reaction mixture was then poured into 500 ml. of cold water and stirred at room temperature for 3 hours. The aqueous portion was then decanted and the residual gummy material was washed twice with water by decantation. The gum and solids were dissolved in 150 ml. of methylene chloride and this solution was extracted twice with 50-ml. portions of water and once with 50 ml. of a saturated aqueous sodium chloride solution. The methylene chloride solution was then dried by passing it through 10 g. of anhydrous sodium sulfate, supported on a sintered glass funnel. The drying agent was then washed with 20 ml. of methylene chloride and the washing combined with the filtrate. The methylene chloride solution was thereupon evaporated at 40° C. in vacuo. The thus-obtained residue was dissolved in 50 ml. of chloroform and treated with stirring with 6.7 ml. of a solution of hydrogen bromide in acetic acid (30% hydrogen bromide). After 3 minutes, the reaction mixture was distilled to a volume of about 10 ml. at 40° C. in vacuo, to give a concentrate. This concentrate was diluted with 10 ml. of chloroform and added to a chromatographic column made up with 100 g. of silica gel and having a 180-ml. volume. The silica gel employed was Brinkman silicic acid for chromatography stirred in hydrocarbon-stabilized alcohol-free chloroform. The column was thereupon eluted with 3 column volumes (540 ml.) of ethanol-stabilized chloroform at a flow rate of about 3.5 ml. per minute. The effluent of this procedure was discarded. The column was thereupon eluted with 1.2 l. of ethanol-stabilized chloroform to which 3% by volume of methanol had been added (at a flow rate of 3.5 ml. per minute). The effluent from this operation was collected in 20 ml. fractions. Each fraction was examined for the presence of triphenylcarbinol or bis(triphenylmethyl) ether by placing a drop of each fraction on a sheet of chromatographic paper (Whatman No. 40) and examining the spot for ultraviolet absorption followed by spraying the paper with 50% aqueous sulfuric acid. Based on the result of this chromatographic determination, fractions 25–43 were combined, washed with 200 ml. of water containing 0.5 ml. of pyridine, dried with anhydrous sodium sulfate, and evaporated in vacuo to give a residue. This residue was recrystallized by dissolving it in ethyl acetate and adding Skellysolve B hexanes until crystallization started, whereupon the vessel was then refrigerated to 4° C. Three crops of crystals were collected which were all homogeneous as determined by thin layer chromatography using silica gel, 10% methanol and 90% benzene. The total yield in three crops was 1.45 g., 0.94 g. and 0.74 mg., a total of 3.13 g. (44%) of N⁴-benzoyl-1-(2',3'-di-O-benzoyl-β-D-arabinofuranosyl)cytosine of melting point 177.5 to 178° C.

EXAMPLE 13

N⁴-acetyl-1-(2',3'-di-O-acetyl-5'-O-triphenylmethyl-β-D-arabinofuranosyl)cytosine A suspension of 750 mg. of 1-(5'-O-triphenylmethyl-β-D-arabinofuranosyl)cytosine in 9 ml. of pyridine was treated with 3 ml. of acetic anhydride with stirring until a uniform solution was obtained. Stirring was then continued for 2 hours whereupon the solution became a crystalline mass. This material was transferred into 90 ml. of water yielding a white crystalline material which was collected by filtration, washed thoroughly with water, and dried, giving 950 mg. of crystals of melting point 248–249.5° C. This material was recrystallized from ethanol, giving 800 mg. of colorless rosettes of N⁴-acetyl-1-(2',3'-di-O-acetyl - 5' - O - triphenylmethyl - β - D - arabinofuranosyl)cytosine of melting point 251–252° C.

*Analysis.*—Calcd. for $C_{34}H_{33}N_3O_8$: C, 66.76; H, 5.44; N, 6.87. Found: C, 67.04; H, 5.47; N, 7.00.

EXAMPLE 14

N⁴-(β-cyclopentylpropionyl)-1-[2',3'-di-o-(β-cyclopentylpropionyl)-β-D-arabinofuranosyl]cytosine In the manner given in Example 12, 1-(5'-O-triphenylmethyl-β-D-arabinofuranosyl)cytosine was reacted with β-cyclopentylpropionyl chloride in pyridine and subsequently treated with hydrogen bromide, dissolved in acetic acid, to give N⁴-(β-cyclopentylpropionyl)-1-[2',3'-di-O-(β-cyclopentylpropionyl)-β-D-arabinofuranosyl]cytosine.

EXAMPLE 15

N⁴-lauroyl-1-(2',3'-di-O-lauroyl-β-D-arabinofuranosyl) cytosine

In the manner given in Example 12, 1-(5'-O-triphenylmethyl-β-D-arabinofuranosyl)cytosine was reacted with lauroyl chloide in pyridine and subsequently treated with hydrogen bromide, dissolved in acetic acid, to give N⁴-lauroyl - 1 - (2',3''-di-O-lauryl-β-D-arabinofuranosyl)cytosine.

EXAMPLE 16

N⁴-decanoyl-1-(2',3'-di-O-decanoyl-β-D-arabinofuranosyl)cytosine

In the manner given in Example 12, 1-(5'-O-triphenylmethyl-β-D-arabinofuranosyl)cytosine was reacted with decanoyl chloride in pyridine and subsequently treated with hydrogen bromide, dissolved in acetic acid, to give N⁴ - decanoyl - 1 - (2',3'-di-O-decanoyl-β-D-arabinofuranosyl)cytosine.

EXAMPLE 17

N⁴-propionyl-1-(2',3'-di-O-propionyl-5'-O-triphenylmethyl-β-D-arabinofuranosyl)cytosine In the manner given in Example 13, 1-(5'-O-triphenylmethyl-β-D-arabinofuranosyl)cytosine was reacted with propionic anhydride in pyridine to give N⁴-propionyl-1-(2',3' - di - O - propionyl - 5' - O - triphenylmethyl - β - D-arabinofuranosyl)cytosine.

EXAMPLE 18

N⁴-butyryl-1-(2',4'-di-O-butyryl-5'-O-triphenylmethyl-β-D-arabinofuranosyl)cytosine In the manner given in Example 13, 1-(5'-O-triphenylmethyl-β-D-arabinofuranosyl)cytosine was reacted with butyric anhydride in pyridine to give N⁴-butyryl-1-(2',3'-di-O-butyryl-5'-O-triphenylmethyl-β-D-arabinofuranosyl) cytosine.

EXAMPLE 19

N⁴-phenylacetyl-1-(2',3'-di-O-phenylacetyl-5'-O-triphenylmethyl-β-D-arabinofuranosyl)cytosine In the manner given in Example 13, 1-(5'-O-triphenylmethyl-β-D-arabinofuranosyl)cytosine was reacted with phenylacetic anhydride in pyridine to give N⁴-phenylacetyl - 1-(2',3'-di-O-phenylacetyl-5'-O-triphenylmethyl-β-D-arabinofuranosyl)cytosine.

EXAMPLE 20

N⁴-hexanoyl-1-(2',3'-di-O-hexanoyl-5'-O-triphenylmethyl-β-D-arabinofuranosyl)cytosine In the manner given in Example 13, 1-(5'-O-triphenylmethyl - β-D-arabinofuranosyl)cytosine was reacted with hexanoic anhydride in pyridine to give N⁴-hexanoyl-1-(2', 3' - di-O-hexanoyl-5'-triphenylmethyl-β-D-arabinofuranosyl)cytosine.

EXAMPLE 21

N⁴-phenylpropionyl-1-(2',3'-di-O-phenylpropionyl-5'-O-triphenylmethyl-β-D-arabinofuranosyl)cytosine In the manner given in Example 13, 1-(5'-O-triphenyl-methyl-β-D-arabinofuranosyl)cytosine was reacted with phenylpropionic anhydride in pyridine to give N⁴-phenyl-propionyl - 1 - (2',3'-di-O-phenylpropionyl-5'-O-triphenyl-methyl-β-D-arabinofuranosyl)cytosine.

In the manner given in Example 13, other N⁴-acyl-1-(2',3' - di-O-acyl-5'-O-triphenylmethyl [and (p-methoxy-phenyl)diphenylmethyl and bis(p-methoxyphenyl)phenyl-methyl]-β-D-arabinofuranosyl)cytosines (III) can be prepared by reacting 1-(5'-O-triphenylmethyl-β-D-arabinofuranosyl)cytosine or the p-methoxy substituted analogues with an acid anhydride of a hydrocarbon carboxylic acid containing from 2 to 12 carbon atoms, inclusive. Representative cytosines of Formula III thus prepared include: N⁴ - valeryl - 1-(2',3'-di-O-valeryl-5'-O-triphenylmethyl-β-D-arabinofuranosyl)cytosine, N⁴-heptanoyl-1-(2',3'-di-O-heptanoyl - 5' - O-triphenylmethyl-β-D-arabinofuranosyl)cytosine, N⁴ - octanoyl - 1-(2',3'-di-O-octanoyl-5'-O-tri-phenylmethyl - β-D-arabinofuranosyl)cytosine, N⁴-acetyl-1 - [2',3'-di-O-diacetyl-5'-O-(p-methoxyphenyl)-diphenyl-methyl - β - D-arabinofuranosyl]cytosine, N⁴-acetyl-1-[2', 3' - di - O-acetyl-5'-O-bis(p-methoxyphenyl)phenylmeth-yl - β-D-arabinofuranosyl]cytosine, N⁴-phenylpropionyl-1 - [2',3' - di-O-phenylpropionyl-5'-O-(p-methoxyphenyl) diphenylmethyl - β-D-arabinofuranosyl]cytosine, and the like.

EXAMPLE 22

1-(2',3'-di-O-benzoyl-β-D-arabinofuranosyl)uracil

In the manner given in Example 12, 1-(5'-O-triphenyl-methyl - β - D-arabinofuranosyl)uracil was reacted with benzoyl chloride and the resulting product was then reacted with a solution of hydrogen bromide in acetic acid to give 1 - (2',4'-di-O-benzoyl-β-D-arabinofuranosyl)uracil.

EXAMPLE 23

1-(2',3'-di-O-benzoyl-β-D-arabinofuranosyl)thymine

In the manner given in Example 12, 1-(5'-O-triphenyl-methyl-β-D-arabinofuranosyl)thymine was reacted with benzoyl chloride and the resulting product was then reacted with a solution of hydrogen bromide in acetic acid to give 1-(2',3'-di-O-benzoyl-β-D-arabinofuranosyl)thymine.

EXAMPLE 24

1-(2',3'-di-O-benzoyl-β-D-arabinofuranosyl)-5-fluorouracil

In the manner given in Example 12, 1-(5'-O-triphenyl-methyl-β-D-arabinofuranosyl)-5 - fluorouracil was reacted with benzoyl chloride and the resulting product was then reacted with a solution of hydrogen bromide in acetic acid to give 1 - (2',3'-di-O-benzoyl-β-D-arabinofuranosyl)-5-fluorouracil.

EXAMPLE 25

N⁶-benzoyl-9-(2',3'-di-O-benzoyl-β-D-arabinofuranosyl) adenine

In the manner given in Example 12, 9-(5',O-triphenyl-methyl-β-D - arabinofuranosyl)adenine was reacted with benzoyl chloride and the resulting product was then reacted with a solution of hydrogen bromide in acetic acid to give N⁶ - benzoyl - 9-(2',3'-di-O-benzoyl-β-D-arabinofur-anosyl)adenine.

EXAMPLE 26

9-(2',3',-di-O-benzoyl-β-D-arabinofuranosyl)-6-mercaptopurine

In the manner given in Example 12, 9-(5'-O-triphenyl-methyl-β-D-arabinofuranosyl) - 6 - mercaptopurine was reacted with benzoyl chloride and the resulting product was then reacted with a solution of hydrogen bromide in acetic acid to give 9-(2',3'-di-O-benzoyl-β-D-arabinofur-anosyl)-6-mercaptopurine.

EXAMPLE 27

1-(2',3'-di-O-acetyl-5'-O-triphenylmethyl-β-D-arabinofuranosyl)uracil

In the manner given in Example 13, 1-(5',O-triphenyl-methyl-β-D-arabinofuranosyl)uracil was reacted with acetic anhydride to give 1-(2',3'-di-O-acetyl-5'-O-triphenyl-methyl-β-D-arabinofuranosyl)uracil.

EXAMPLE 28

1-(2',3'-di-O-acetyl-5'-O-triphenylmethyl-β-D-arabinofuranosyl)-5-fluorouracil

In the manner given in Example 13, 1-(5'-O-triphenyl-methyl-β-D-arabinofuranosyl)-5-fluorouracil was reacted with acetic anhydride to give 1-(2',3'-di-O-acetyl-5'-O-triphenylmethyl-β-D-arabinofuranosyl)-5-fluorouracil.

EXAMPLE 29

N⁶-acetyl-9-(2',3'-di-O-acetyl-5'-O-triphenyl-methyl-β-D-arabinofuranosyl)adenine In the manner given in Example 13, 9-(5'-O-triphenyl-methyl-β-D-arabinofuranosyl)adenine was reacted with acetic anhydride to give N⁶-acetyl-9-(2',3'-di-O-acetyl-5'-O-triphenylmethyl-β-D-arabinofuranosyl)adenine.

EXAMPLE 30

9-(2',3'-di-O-acetyl-5'-O-triphenylmethyl-β-D-arabinofuranosyl)-6-mercaptopurine In the manner given in Example 13, 9-(5'-O-triphenyl-methyl-β-D-arabinofuranosyl)-6-mercaptopurine was reacted with acetic anhydride to give 9-(2',3'-di-O-acetyl-5'-O-triphenylmethyl - β - D - arabinofuranosyl)-6-mer-captopurine.

In the same manner illustratively shown in Example 12, other arabinosides can be synthesized wherein positions other than 5', capable of reacting with a phosphorylating agent, are protected.

EXAMPLE 31

N⁴ - acetyl - 1 - (2',3' - di - O - acetyl - β - D - arabinofuranosyl)cytosine and 1-(2',3'-di-O-acetyl-β-D-arabinofuranosyl)cytosine A suspension of 10 ml. of 80% aqueous acetic acid and 1.3 g. of N⁴-acetyl-1-(2',3'-di-O-acetyl-5'-O-triphenyl-methyl-β-D-arabinofuranosyl)cytosine was heated to reflux for 10 minutes. The suspension was then refrigerated, filtered free of triphenylcarbinol, and evaporated in vacuo at a temperature between 30–40° C. The product was taken up in 20 ml. of methanol and poured onto a column containing a volume of 200 ml. of silica gel slurried with benzene. The column was then eluted with thirty 20-ml. fractions consisting of methanol (25%), benzene (75%). Fractions 5–11 were combined and recrystallized from acetone-Skellysolve B hexanes to give 240 mg. of product melting at 171–172.5° C. This product was recrystallized from the same mixture of solvents to give N⁴ - acetyl - 1 - (2',3' - di - O - acetyl - β - D - arabinofuranosyl)cytosine of melting point 174.5 to 175.5° C. and the following analysis:

Analysis.—Calcd. for $C_{15}H_{19}N_3O_8$: C, 48.78; H, 5.19; N, 11.38. Found: C, 48.79; H, 4.81; N, 11.66.

Fractions 26 to 29 contained a small amount of 1-(2', 3'-di-O-acetyl-β-D-arabinofuranosyl)cytosine.

EXAMPLE 32

N⁴-anisoyl-1-(2',3'-di-O-benzoyl-β-D-arabinofuranosyl)cytosine

A. N⁴-anisoyl-1-β-D-arabionfuranosylcytosine.—5 g. of 1-β-D-arabinofuranosylcytosine and 25 ml. of anisoyl chloride were dissolved in 100 ml. of pyridine and the solution stirred at about 25° C. for 6 hours. To this mixture was added 400 ml. of 1.5 N hydrochloric acid and the thus-obtained solution was allowed to stand overnight at room temperature, between 22–24° C. The solids were then filtered, washed and ground thoroughly with water and air-dried. They were thereupon suspended in a mixture consisting of 375 ml. of water and 250 ml. of ethanol which was heated to 70° C. on a steam bath. The crude suspension was then chilled to 4° C. and the pH adjusted to 8 by adding 1 N sodium hydroxide solution. The insoluble solids were immediately recovered by filtration, washed with water, air-dried, and then washed with 300 ml. of ether, filtered and air-dried, to give 16.6 g. of crude $N^4$-anisoyl-1-$\beta$-D-arabinofuranosylcytosine.

This crude product was taken up with 195 ml. of pyridine and 65 ml. of water and chilled to ice temperature. The solution was then treated with vigorous stirring with 350 ml. of 1.5 N sodium hydroxide for one-half hour. The reaction was then terminated by the addition of 350 ml. of Dowex 50X8 (50–100 mesh) pyridinium resin followed by stirring for 20 minutes (pH 7.0). The solution was filtered free of insoluble material and the resulting residue was washed with water. The combined filtrates were taken to dryness in vacuo at 50° C. and the residue stirred with three 200-ml. portions of ether and filtered. The solid was then suspended in 300 ml. of boiling water and filtered. This process was repeated three times. The combined filtrates were evaporated to a small volume under reduced pressure, giving 2.0 g. of product, of melting point 197–200° C. (decomposition). This crude material was recrystallized four times from water, and once from ethanol, to give pure $N^4$-anisoyl-1-$\beta$-D-arabinofuranosylcytosine of melting point 200.5 to 201.5° C. with decomposition.

*Analysis.*—Calcd. for $C_{17}H_{19}N_3O_7$: C, 54.11; H, 5.08; N, 11.14. Found: C, 54.38; H, 4.82; N, 11.31.

In the same manner as shown in Example 32A, other $N^4$-acyl-1-$\beta$-D-arabinofuranosylcytosines are prepared by reacting 1-$\beta$-D-arabinofuranosylcytosine with an acid chloride of a hydrocarbon carboxylic acid, as defined above, and selectively hydrolyzing with a base at low temperature the triacyl derivative of 1-$\beta$-D-arabinofuranosylcytosine to obtain the $N^4$-acyl-1-$\beta$-D-arabinofuranosylcytosine. Representative compounds thus obtained include $N^4$-benzoyl-, $N^4$-phenylacetyl-, $N^4$-phenylpropionyl-, $N^4$-lauroyl-, $N^4$-acetyl-, $N^4$-propionyl-, $N^4$-butyryl-, $N^4$-hexanoyl-, $N^4$-octanoyl-, and $N^4$-decanoyl-1-$\beta$-D-arabinofuranosylcytosine.

B. $N^4$ - anisoyl - 1 - [5'-O-(p-methoxyphenyl)diphenylmethyl-$\beta$-D-arabinofuranosyl]cytosine.—A solution of 4.8 g. of $N^4$-anisoyl-1-$\beta$-D-arabinofuranosylcytosine in 50 ml. of pyridine was treated with (p-methoxyphenyl)diphenylchloromethane. After 9 hours, 10 ml. of methanol was added and the pyridine solution poured into 600 ml. of water with stirring. When the resulting gum had coagulated, the solution was decanted, the gum was washed several times with water by decantation and then dissolved in methylene chloride. The methylene chloride solution was washed twice with water and once with saturated sodium chloride solution. The solution was then dried over anhydrous sodium sulfate and evaporated to dryness at 30° C. in vacuo, to give a residue. This residue was dissolved in benzene and then absorbed on a column of silica gel (5.8 x 48 cm.) slurried with benzene and the column was then eluted as follows: twenty 100-ml. fractions of 2% methanol, 98% benzene, and then 40 100-ml. fractions of 5% methanol, 95% benzene. Fractions 49–60 were combined and triturated with ether, giving a crystalline solid which was collected and washed with eher, providing 4.21 g. of crude $N^4$-anisoyl-1-[5'-O-(p-methoxyphenyl)diphenylmethyl - $\beta$ - D - arabinofuranosyl]cytosine.

In the same manner given in Example 32B, other $N^4$ - acyl-1-[5'-O-(p - methoxyphenyl)diphenylmethyl-$\beta$-D-arabinofuranosyl]-cytosines can be prepared by using as starting material $N^4$-acyl-1-$\beta$-D-arabinofuranosylcytosine in which the acyl group is of a hydrocarbon carboxylic acid containing 2 to 12 carbon atoms, inclusive. In this manner $N^4$-benzoyl (or phenylacetyl, phenylpropionyl, lauroyl, acetyl, propinoyl, butyryl, hexanoyl, octanoyl, decanoyl)-1-[5'-O-(p-methoxyphenyl)diphenylmethyl-$\beta$-D-arabinofuranosyl]cytosines are obtained.

C. $N^4$-anisoyl-1-(2',4'-di-O-benzoyl-$\beta$-D-arabinofuranosyl)-cytosine.—4 g. of $N^4$-anisoyl-1-[5'-O-(p-methoxyphenyl)diphenylmethyl-$\beta$-D-arabinofuranosyl]cytosine in 20 ml. of dry pyridine was treated with 3 ml. of benzoyl chloride. The sealed vessel containing the reaction mixture was allowed to stand for 18 hours at room temperature. The reaction mixture was thereupon poured into ice water, stirred for 3 hours at about 25° C. whereby a gummy solid precipitated. This crude product was extracted with two 50-ml. portions of methylene chloride, the extracts were combined, washed five times with water, one time with saturated aqueous sodium chloride and evaporated to dryness in vacuo. The residue was codistilled wtih toluene at reduced pressure to eliminate residual pyridine and the thus-obtained residue was taken up in 50 ml. of dioxane and treated with 80% aqueous acetic acid. To this solution was added enough hydrochloric acid to produce a 0.03 N solution. The mixture was then allowed to stand for a period of 5 hours. The solvents were removed in vacuo at 40° C. and the residue was treated with 100 ml. of a 1:1 chloroform-ethanol mixture which was then evaporated. The thus-obtained residue was taken up in chloroform and absorbed on a column of silica gel (2.8 cm. diameter, 40 cm. high, having a 250-ml. column volume) slurried with chloroform. The column was then eluted with four 250 ml. fractions of chloroform containing 0.75% ethanol followed by six 250 ml. fractions of chloroform containing an additional 3% methanol. Fractions 5–8 were combined and absorbed on a silica gel column (2.8 cm. x 50 cm.). This column was then eluted with 4 column volumes of chloroform, followed by 2.1 of 3% methanol in chloroform solution, the eluates being collected in fractions of 20 ml. each at a column rate of 5 ml. per minute. Fractions 46–54 contained 220 mg. of the desired material which when recrystallized from ethyl acetate-Skellysolve B hexanes had a melting point of 172–173° C. This material was pure $N^4$anisoyl-1-(2',4'-di-O-benzoyl-$\beta$-D-arabinofuranosyl)cytosine.

*Analysis.*—Calcd. for $C_{31}H_{27}N_3O_9$: C, 63.58; H, 4.65; N, 7.18. Found: C, 63.62; H, 5.12; N, 7.23.

In Example 32 and the subsequent examples various ion exchange resins (Dow Company) are utilized which can be described as follows:

DOWEX 50X8

Dowex 50X8 is a strongly acidic cation exchanged resin composed of nuclear sulfonic acid exchange groups attached to a styrene polymer lattice cross linked with approximately 8% divinylbenzene.

Dower 50–WX8 is a specially purified form of Dowex 50X8 in which the resin has a white (W) color rather than the yellow brown color of Dowex 50X8.

DOWEX 1X8

Dowex 1X8 is a strongly basic anion exchange resin composed of quaternary ammonium exchange groups attached to a polymer lattice as described above.

DOWEX AG 1X8

Dowex AG 1X8 is a specially purified and sized form of this Dow Company resin supplied by Bio-Rad Laboratories of Richmond, California.

In the manner given in Example 32C, other $N^4$-acyl-1-(2',3-di-O-acyl-$\beta$-D-arabinofuranosyl]cytosines are prepared by acylating an $N^4$-acyl-1-[5'-O-(p-methoxyphenyl) diphenylmethyl-$\beta$-D-arabinofuranosyl]cytosine and cleaving the ether to obtain the corresponding primary alcohol. Representative compounds thus obtained include $N^4$-benzoyl - 1-(2',3'-di-O-acetyl-$\beta$-D-arabinofuranosyl)cytosine, $N^4$-phenylacetyl - 1-(2',3'-di-O-benzoyl-$\beta$-D-arabinofuranosy)cytosine, $N^4$ - phenylacetyl-1-(2'3'-di-O-propionyl-β-D-arabinofuranosyl)cytosine, N⁴ - phenylpropionyl-1-(2′,3′-di-O-decanoyl-βD-arabinofuranosyl)cytosine, N⁴-lauroyl - 1-(2′,3′-di-O-valeryl-β-D-arabinofuranosyl)cytosine, N⁴-acetyl-1-(2′,3′-di-O-benzoyl-β-D-aribinofuranosyl)cytosine, and the like.

EXAMPLE 33

N⁴-butyryl-1-(2′,3′-di-O-butyryl-β-D-arabinofuransoyl)cytosine

In the manner given in Example 31, N⁴-butyryl-1-(2′,3′ - di-O-butyryl-5′-O-triphenylmethyl-β-D-arabinofuranosyl)cytosine is heated with aqueous acetic acid to give N⁴ - butyryl - 1-(2′,3-di-O-butyryl-β-D-arabinofuranosyl)cytosine.

EXAMPLE 34

N⁴-phenylpropionyl-1-(2′,3′-di-O-phenylacetyl-β-D-arabinofuranosyl)cytosine

In the manner given in Example 31, N⁴-phenylacetyl-1 - (2′,3′ - di-O-phenylacetyl-5′-O-triphenylmethyl-β-D-arabinofuranosyl)cytosine is heated with aqueous acetic acid to give N⁴-phenylacetyl-1-(2′,3′-di-O-phenylacetyl-β-D-arabinofuranosyl)cytosine.

EXAMPLE 35

N⁴-hexanoyl-1-(2′,3′-di-O-hexanoyl-β-D-arabinofuranosyl)-cytosine

In the manner given in Example 31, N⁴-hexanoyl-1-(2′,3′ - di-O-hexanoyl-5′-O-triphenylmethyl-β-D-arabinofuranosyl)cytosine is heated with aqueous acetic acid to give N⁴ - hexanoyl-1-(2′,3′-di-O - hexanoyl-β-D-arabinofuranosyl)cytosine.

EXAMPLE 36

N⁴-phenylpropionyl-1-(2′,3′-di-O-phenylpropionyl-β-D-arabinofuranosyl)cytosine

In the manner given in Example 31, N⁴-phenylpropionyl - 1-(2′,3′-di-O-phenylpropionyl-5′-O-triphenylmethyl-β-D-arabinofuranosyl)cytosine is heated with aqueous acetic acid to give N⁴-phenylpropionyl-1-(2′,3′-di-O-phenylpropionyl-β-D-arabinofuranosyl)cytosine.

In the same manner given in Example 31, other N⁴-acyl-1-(2′,3′-di-O-acyl-β-D-arabinofuranosyl)cytosines are obtained by heating the corresponding N⁴-acyl-1-(2′,3′-di-O-acyl-5′-O-triphenylmethyl - β - D - arabinofuranosyl)cytosine with aqueous acetic acid. Representative compounds thus obtained include: N⁴-valeryl-1-(2′,3′-di-O-valeryl-β-D-arabinofuranosyl)cytosine, N⁴-lauroyl - 1 - (2′,3′- di - O-lauroyl-β-D-arabinofuranosyl)cytosine, N⁴ - heptanoyl - 1- (2′,3′-di-O-heptanoyl-β-D-arabinofuranosyl)cytosine, N⁴-octanoyl-1-(2′,3′-di-O-octanoyl-β - D - arabinofuranosyl)-cytosine, N⁴-benzoyl - 1 - (2′,3′-di-O-benzoyl-β-D-arabinofuranosyl)cytosine, and the like.

EXAMPLE 37

1-β-D-arabinofuransoylcytosine 5′-phosphate

To a solution of 40 ml. of pyridine, 0.325 M in 2-cyanoethyl phosphate, was added 2.5 g. of N⁴-acetyl-1-(2′,3′-di-O - acetyl - β - D - arabinofuranosyl)cytosine containing a small amount of 1-(2′,3′-di-O-acetyl-β-D-arabinofuranosyl)cytosine. To this solution was added an additional 20 ml. of pyridine containing 5.6 g. of dicyclohexylcarbodiimide. The reaction mixture was shaken in the dark for 2 days, after which time 10 ml. of water was added and the solution warmed to 40° C. The reaction mixture was shaken for 1 hour, after which time an additional 75 ml. of water was added and the solution was filtered free of insoluble dicyclohexylurea. The filtrate was taken to dryness, diluted with 50 ml. of water, and again evaporated to remove residual pyridine. The thus-obtained residue was then partitioned between water and ether, 150 ml. (1:1) and the aqueous portion freed of ether in vacuo after a second extraction. The remaining aqueous solution (90 ml.) was then treated with 2.16 g. (90 mmoles) of lithium hydroxide and the solution heated at 100° C. for a period of 1 hour. Thereafter the suspension was chilled and filtered free of lithium phosphate. The solids were washed with 0.01 N lithium hydroxide solution which was added to the filtrate. The filtrate was then adjusted to a pH of 7 by addition of an acid exchange resin [Dowex 50×8(H⁺)]. The mixture was thereupon filtered and the resin-free solution was distilled to a volume of 25 ml. at 40° C. and under reduced pressure. The solution was then passed through 75 ml. of fresh Dowex 50–×8 resin. The resin was eluted with water until the pH of the eluate was in the range of 4–5. The pH of the resulting solution was adjusted to 7.5 by the addition of concentrated ammonium hydroxide. The product-containing solution (about 200 ml.) was absorbed onto a column charged with Dowex AG–1×8 (formate) resin (125 ml.) and the column was eluted with 125 ml. of water. Thereafter, the column was eluted with 0.02 M formic acid solution and the eluate collected in 20-ml. fractions at a flow rate of 2 ml. per minute. After a 200-ml. forerun which was discarded, fractions 13–33 were combined and lyophilized to give a white crystalline solid weighing 250 mg. This material when twice recrystallized from water at 4° C. gave fine needles of 1-β-D-arabinofuranosylcytosine 5′-phosphate having the following analysis:

*Analysis.*—Calcd. for $C_9H_{14}O_8N_3P$: C, 33.44; H, 4.37; N, 13.00; P, 9.58. Found: C, 33.37; H, 4.88; N, 12.61; P, 9.75.

EXAMPLE 38

N⁴-benzoyl-1-β-D-arabinofuranosylcytosine 5′-phosphate

A solution was prepared containing 50 mmoles of pyridinium 2-cyanoethyl phosphate, dissolved in 10 milliliters of dry pyridine, and thereto was added 2.77 g. of N⁴-benzoyl-1-(2′,3′-di-O-benzoyl-β-D - arabinofuranosyl)-cytosine, whereupon the solution was taken to dryness. The residue was then dissolved in 25 ml. of pyridine, 3.09 g. (150 mmoles) of dicyclohexylcarbodiimide was added and the mixture shaken at room temperature for 5½ days. About 15 ml. of water was then added and the mixture extracted twice with Skellysolve B hexanes and filtered free of the insoluble urea compound. The solution was then diluted to 40 ml. with pyridine, chilled to about 0° C. with ice, and made about 1 N in sodium hydroxide by the addition of 40 ml. of ice-cold 2 N sodium hydroxide solution. The reaction was terminated after 20 minutes by adding an excess of pyridinium-Dowex 50×8 ion-exchange resin. The resin was separated by filtration, washed with water, and the aqueous washing and filtrate were evaporated under reduced pressure to about 25 ml. following the addition of 200 mg. of ammonium bicarbonate. The precipitate in the 25 ml. of solution was removed by filtration. The filtrate was evaporated under reduced pressure and the residue taken up in a solvent system composed of 1 M ammonium acetate (pH 6) and isopropyl acyl group connected to the amino group of the cytosine column having a column volume of 1850 ml. made up with the same solvent system. The column was then eluted with the 1 M ammonium acetate-isopropyl alcohol (2:5) mixture, the first 600 ml. of eluate being discarded. Then, fractions of 20 ml. each were collected (325 fractions total). Fractions 55–110, when combined, contained approximately 90% of theory of the total amount of N⁴-benzoyl-1-β-arabinofuranosylcytosine 5′-phosphate. These fractions were evaporated to a small volume in the presence of 10 ml. of pyridine, the concentrate was diluted with water to a volume of 50 ml., and the product absorbed on a column charged with pyridinium-Dowex 50W×8 ion-exchange resin. The column was then eluted with 3 l. of deionized water. The total effluent was concentrated under reduced pressure and rediluted with 1% aqueous pyridine four times, followed by concentration. The thus-obtained residue was taken up in dilute aqueous pyridine and lyophilized twice from this solvent to give a white solid, N⁴-benzoyl-1-β-D-arabinofuranosylcytosine 5'-phosphate solvated with pyridine and water, in a yield of 1.81 g. (70%).

Analysis.—Calcd. for $C_{16}H_{18}N_3O_9P \cdot H_2O \cdot$pyridine: P, 5.95. Found: P, 6.06.

Heating this solvate to 100° C. in vacuo (15 mm. Hg) for 72 hours gave $N^4$-benzoyl-1-β-D-arabinofuranosylcytosine 5'-phosphate In the same manner given in Examples 37 and 38, other N-acyl-1-(2′,3′-di-O-acyl-β-D-arabinofuranosyl)cytosines can be phosphorylated, with loss of the acyl groups in positions 2′ and 3′, and additionally with loss of the acyl group connected to the amino group of the cytosine if the first-obtained cyano phosphate is treated with a strong base at temperatures above 75° C. for prolonged periods.

EXAMPLE 39

1-β-D-arabinofuranosylcytosine 5'-phosphate

In the manner given in Example 37, treating $N^4$-(β-cyclopentylpropionyl)-1-[2′,3′-di-O-(β-cyclopentylpropionyl]-β-D-arabinofuranosyl]cytosine with 2-cyanoethyl phosphate, dicyclohexylcarbodiimide, and thereafter with lithium hydroxide at 100° C. gave 1-β-D-arabinofuranosylcytosine 5'-phosphate.

EXAMPLE 40

$N^4$-lauroyl-1-β-D-arabinfuranosylcytosine 5'-phosphate

In the manner given in Example 38, treating $N^4$-lauroyl-1-(2′,3′-di-O-lauroyl-β-D-arabinofuranosyl)cytosine with 2-cyanoethyl phosphate, then dicyclohexylcarbodiimide, and finally sodium hydroxide at 10° C. gave $N^4$-lauroyl-1-β-D-arabinofuranosylcytosine 5'-phosphate.

EXAMPLE 41

$N^4$-anisoyl-1-β-D-arabinofuranosylcytosine 5'-phosphate

In the manner given in Example 38, treating $N^4$-lauroyl-anisoyl - 1 (2′,3′-di-O-benzoyl-β-D-arabinofuranosyl)cytosine with 2-cyanoethyl phosphate, then dicyclohexyl-carbodiimide and finally sodium hydroxide at 0° C. gave $N^4$-anisoyl-1-β-D-arabinofuranosylcytosine 5'-phosphate.

Following the procedure of Example 37, $N^4$-decanoyl-1-(2′,3′-di-O-decanoyl-β - D - arabinofuranosyl)cytosine, $N^4$-propionyl - 1 - (2′,3′-di-O-propionyl-β-D-arabinofuranosyl)cytosine, $N^4$-butyryl-1-(2′,3′-di-O-butyryl - β - D-arabinofuranosyl)cytosine, $N^4$-phenylacetyl-1-(2′,3′-di-O-phenylacetyl-β-D-arabinofuranosyl)cytosine, $N^4$ - hexanoyl-1-(2′,3′-di-O-hexanoyl - β - D - arabinofuranosyl)cytosine, and $N^4$-phenylpropionyl-1-(2′,3′-di-O-phenylpropionyl-β-D-arabinofuranosyl)cytosine can be converted to 1-β-D-arabinofuranosyl-cytosine 5'-phosphate.

EXAMPLE 42

$N^4$-benzoyl-1-(2′,3′-di-O-acetyl-β-D-arabinofuranosyl)cytosine 5'-phosphate

A solution of $N^4$-benzoyl-1-β-D-arabinofuranosylcytosine 5'-phosphate (Example 38) was suspended in a mixture of 15 ml. pyridine and 15 ml. of acetic anhydride. This mixture was stirred for about 18 hours at room temperature (about 25° C.). The homogeneous solution was then diluted with 15 ml. of water and stirred for 3 hours at room temperature. The solvent was then removed at 30° C. in high vacuum and the residue triturated with ether. A gummy material remained which was freed from ether in vacuo, then dissolved in dry pyridine and the solution stored at 4° C. The crystals which separated by this procedure were collected on a filter and represented pure $N^4$-benzoyl-1-(2′,3′-di-O-acetyl-β-D-arabinofuranosyl)cytosine 5'-phosphate.

EXAMPLE 43

$N^4$-benzoyl-1-(2′,3′-di-O-propionyl-β-D-arabinofuranosyl)cytosine 5'-phosphate In the manner given in Example 42, treating $N^4$-benzoyl-β-D-arabinofuranosylcytosine 5'-phosphate with propionic anhydride in pyridine gives $N^4$-benzoyl-1-(2′,3′-di-O-propionyl-β-D-arabinofuranosyl)cytosine 5'-phosphate.

EXAMPLE 44

$N^4$-benzoyl-1-(2′,3′-di-O-butyryl-β-D-arabinofuranosyl)cytosine 5'-phosphate

In the manner given in Example 42, treating $N^4$-benzoyl-1-β-D-arabinofuranosylcytosine 5'-phosphate with butyric anhydride in pyridine gives $N^4$-benzoyl-1-(2′,3′-di-O-butyryl-β-D-arabinofuranosyl)cytosine 5'-phosphate.

EXAMPLE 45

$N^4$-benzoyl-1-(2′,3′-di-O-benzoyl-β-D-arabinofuranosyl)cytosine 5'-phosphate

In the manner given in Example 42, treating $N^4$-benzoyl-1-β-D-arabinofuranosylcytosine 5'-phosphate with benzoic anhydride in pyridine gives $N^4$-benzoyl-1-(2′,3′-di-O-benzoyl-β-D-arabinofuranosyl)cytosine 5' - phosphate.

EXAMPLE 46

$N^4$-benzoyl-1-(2′,3′-di-O-phenylacetyl-β-D-arabinofuranosyl)cytosine 5'-phosphate In the manner given in Example 42, treating $N^4$-benzoyl-1-β-D-arabinofuranosylcytosine 5'-phosphate with phenylacetic anhydride in pyridine gives $N^4$-benzoyl-1-(2′,3′-di-O-phenylacetyl-β-D - arabinofuranosyl)cytosine 5'-phosphate.

EXAMPLE 47

$N^4$-benzoyl-1-(2′,3′-di-O-valeryl-β-D-arabinofuranosyl)cytosine 5'-phosphate

In the manner given in Example 42, treating $N^4$-benzoyl-1-β-D-arabinofuranosylcytosine 5'-phosphate with valeric anhydride in pyridine gives $N^4$-benzoyl-1-(2′,3′-di-O-valeryl-β-D-arabinofuranosyl)cytosine 5'-phosphate.

EXAMPLE 48

$N^4$-anisoyl-1-(2′,3′-di-O-benzoyl-β-D-arabinofuranosyl)cytosine 5'-phosphate

In the manner given in Example 42, treating $N^4$-anisoyl-1-β-D-arabinofuranosylcytosine 5'-phosphate with benzoyl chloride in pyridine gives $N^4$-anisoyl-1-(2′,3′-di-O-benzoyl-β-D-arabinofuranosyl)cytosine 5'-phosphate.

EXAMPLE 49

$N^4$-acetyl-1-(2′,3′-di-O-acetyl-β-D-arabinofuranosyl)cytosine 5'-phosphate

In the manner given in Example 42, 1-β-D-arabinofuranosylcytosine 5'-phosphate was reacted with excess acetic anhydride in pyridine to give $N^4$-acetyl-1-(2′,3′-di-O-acetyl-β-D-arabinofuranosyl)cytosine 5'-phosphate.

EXAMPLE 50

$N^4$-propionyl-1-(2′,3′-di-O-propionyl-β-D-arabinofuranosyl)cytosine 5'-phosphate In the manner given in Example 42, 1-β-D-arabinofuranosyl-cytosine 5'-phosphate was reacted with excess propionic anhydride in pyridine to give $N^4$-propionyl-1-(2′,3′-di-O-propionyl-β-D-arabinofuranosyl)cytosine 5'-phosphate.

EXAMPLE 51

$N^4$-phenylpropionyl-1-(2′,3′-di-O-phenylpropionyl-β-D-arabinofuranosyl)cytosine 5'-phosphate In the manner given in Example 42, 1-β-D-arabinofuranosyl-cytosine 5'-phosphate was reacted with excess phenylproprionic anhydride in pyridine to give $N^4$-phenylpropionyl-1-(2′,3′ - di - O - phenylpropionyl-β-D-arabinofuranosyl)cytosine 5'-phosphate.

EXAMPLE 52

N⁴-phenylacetyl-1-(2',3'-di-O-phenylacetyl-β-D-arabino-
furanosyl)cytosine 5'-phosphate In the manner given in Example 42, 1-β-D-arabino-
furanosyl-cytosine 5'-phosphate was reacted with excess
phenylacetic anhydride in pyridine to give N⁴-phenyl-
acetyl-1-(2',3'-di-O-phenylacetyl - β - D - arabinofuran-
osyl)cytosine 5'-phosphate.

EXAMPLE 53

N⁴-hexanoyl-1-(2',3'-di-O-hexanoyl-β-D-arabino-
furanosyl)cytosine 5'-phosphate

In the manner given in Example 42, 1-β-D-arabino-
furanosylcytosine 5'-phosphate was reacted with excess
hexanoic anhydride in pyridine to given N⁴-hexanoyl-1-
(2',3'-di-O-hexanoyl-β-D-arabinofuranosyl)cytosine 5'-
phosphate.

EXAMPLE 54

N⁴-(β-cyclopentylpropionyl) - 1 - [2',3' - di - O - (β-cyclo-
pentylpropionyl) - β - D - arabinofuranosyl]cytosine 5'-
phosphate In the manner given in Example 42, 1-β-D-arabino-
furanosylcytosine 5'-phosphate was reacted with excess
β-cyclopentylpropionyl chloride in pyridine to give N⁴-
(β - cyclopentylpropionyl)-1-[2',3'-di-O-(β-cyclopentyl-
propionyl)-β-D-arabinofuranosyl]-cytosine 5'-phosphate.

EXAMPLE 55

N⁴-lauroyl-1-(2',3'-di-O-lauroyl-β-D-arabinofuran-
osyl)cytosine 5'-phosphate

In the manner given in Example 42, 1-β-D-arabino-
furanosylcytosine 5'-phosphate was reacted with excess
lauroyl chloride in pyridine to give N⁴-lauroyl-1-(2',3'-
di-O-lauroyl-β-D-arabinofuranosyl)cytosine 5'-phosphate.

EXAMPLE 56

N⁴-decanoyl-1-(2',3'-di-O-decanoyl-β-D-arabinofuran-
osyl)cytosine 5'-phosphate

In the manner given in Example 42, 1-β-D-arbinofuran-
osylcytosine 5'-phosphate was reacted with excess de-
canoyl chloride in pyridine to give N⁴-decanoyl-1-(2',3'-
di-O-decanoyl - β - D-arabinofuranosyl)cytosine 5'-phos-
phate.

EXAMPLE 57

N⁴-benzoyl - 1 - (2',3' - di-O-acetyl-β-D-arabinofuranosyl)
cytosin-5'-yl N⁴-anisoyl-1-(2',3'-di-O-benzoyl - β - D-
arabinofuranosyl)cytosin-5'-yl phosphate (XI); and bis
(1-β-D-arabinofuranosylcytosin-5'-yl) phosphate (XII)
and 1-β-D-arabinofuranosyluracil-5'-yl 1-β-D-arabino-
furanosylcytosin-5'-yl phosphate (XIII) as triethylam
monium salts

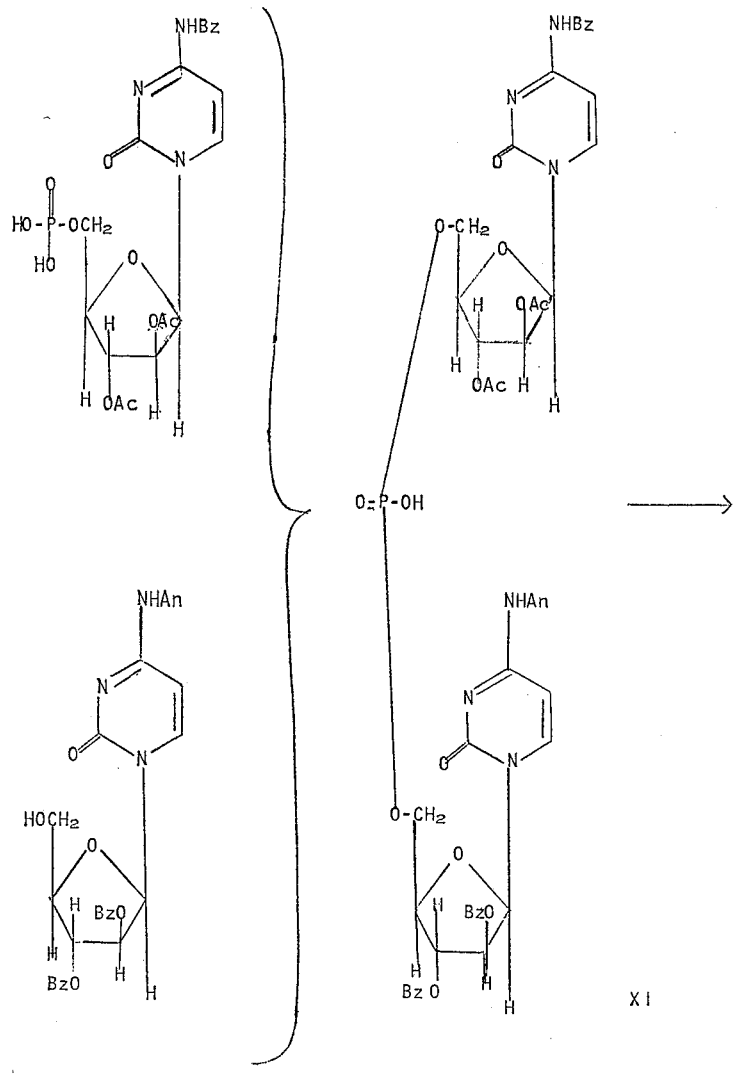

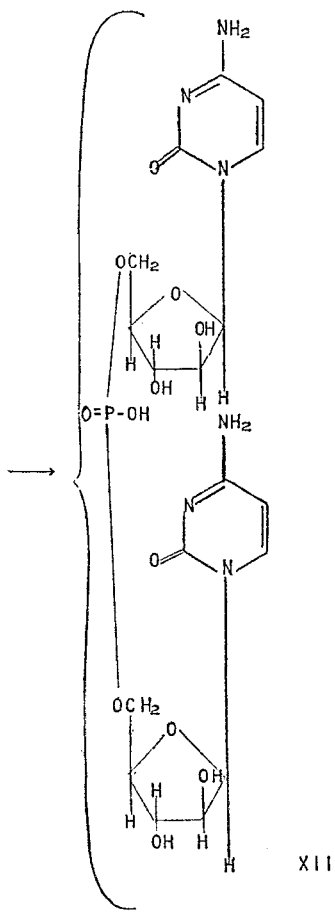
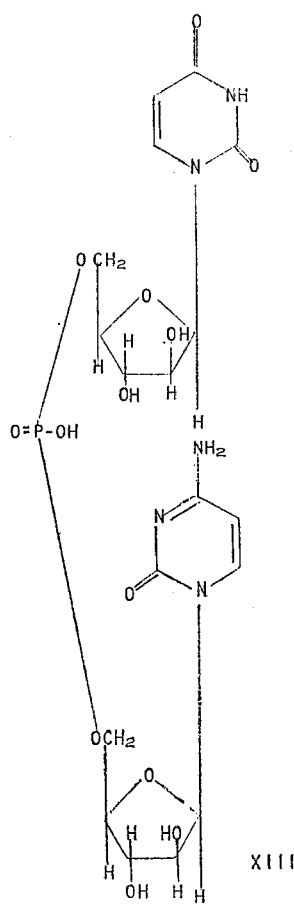

In the above formulae Bz stands for the benzoyl group, Ac for the acetyl group and An for the anisoyl group.

A solution of 0.2 mmoles of $N^4$-benzoyl-1-(2′,3′-di-O-acetyl-β-D-arabinofuranosyl)cytosine 5′-phosphate and 0.2 mmole of $N^4$ - anisoyl-1-(2′,3′-di-O-benzoyl-β-D-arabinofuranosyl)cytosine in 2 ml. of dry pyridine with 2 ml. dicyclohexylcarbodiimide (melted) was shaken in a stoppered flask, protected from light with aluminum foil, for 5 days. At the end of the period 2 ml. of 50% aqueous pyridine was added and the reaction mixture was allowed to stand overnight (about 18 hours). The reaction mixture was then filtered to eliminate the precipitated urea and the precipitate was washed with two 2-ml. portions of a 1:1 mixture of pyridine and water. The washings were added to the solution and the solution was then extracted 4 times with 10 ml. of Skellysolve B hexanes, the extracts being discarded. The remaining aqueous pyridine solution was evaporated at 34° C. in a rotary evaporator to give a residue. To this residue 10 ml. of water was added and the mixture was evaporated to rid the product of pyridine. The dry product was again treated with water and again evaporaed and dried with the aid of a water aspirator. The thus-obtained gummy $N^4$-benzoyl-1-(2′,3′-di-O-acetyl-β-D-arabinofuranosyl)cytosin-5′-yl $N^4$ - anisoyl-1-(2′,3′-di-O-benzoyl-β-D-arabinofuranosyl)cytosin - 5′ - yl phosphate (XI) was used without further purification for the production of bis(1-β-D-arabinofuranosylcytosin-5′-yl) phosphate (XII) and 1-β-D-arabinofuranosyluracil-5′-yl 1-β-D-arabinofuranosylcytosin-5′-yl phosphate (XIII).

The crude gummy material (compound XI) was dissolved in 30 ml. of methanol and the solution was diluted to turbidity with concentrated aqueous ammonium hydroxide (50 ml.). The mixture was allowed to stand for 22 hours and was then analyzed by thin layer chromatography using silica gel and the solvent system isopropyl alcohol-ammonia-water (7:1:2) showed that the reaction mixture contained two phosphorus containing products (molybdate spray) of a mobility consistent with there being dinucloside phosphates. The solvent was thereupon removed under reduced pressure at 35° C. and the residue distributed between 10 ml. of water and 10 ml. of ether. The aqueous phase was adjusted to pH 8 with 3 N ammonium hydroxide solution, and the two-phase system stirred overnight at room temperature, about 22–24° C. The aqueous layer was separated, heated to 35° C. at reduced pressure to eliminate the ether, and freeze-dried. A white, fluffy solid was obtained which was redissolved in 10 ml. of water and absorbed on a chromatographic column (425 ml. volume) filled with DEAE cellulose. This column was eluted with gradient solutions of from 0 to 0.08 molar aqueous triethylammonium bicarbonate (pH 7.5). A total of 3.6 l. of eluate was collected in 20-ml. fractions. Fractions 67–80 showing a peak containing 1300 optical density units measured at pH 5 at 271 millimicrons were combined and lyophilized and the thus-obtained residue taken up in 10 ml. of distilled water. This material was homogeneous by cellulose thin-layer chromatography described above and proved to be bis(1-β-D-arabinofuranosylcytosin-5′-yl phosphate as the triethylammonium salt. Treatment of this material with snake venom diesterase yielded quantitatively 1-β-D-arabinofuranosylcytosine and 1-β-D-arabinofuranosylcytosin-5′-yl phosphate.

Fractions 95–102 were also homogeneous as shown by papergram. These fractions were lyophilized to give a white powder which was found to be 1-β-D-arabinofuranosyluracil-5′-yl 1-β-D-arabinofuranosylcytosin-5′-yl phosphate as the triethylammonium salt. Hydrolysis with snake venom diesterase gave 1-β-D-arabinofuranosyluracil, 1-β-D-arabinofuranosylcytosine and the corresponding 5′-phosphates of these compounds.

The thus-obtained triethylammonium salt of bis(1-β-D-arabinofuranosylcytosin-5′-yl) phosphate was converted to the free acid ester, bis(1-β-D-arabinofuranosylcytosin-

EXAMPLE 58

N⁴ - anisoyl-1-(2',3'-di-O-benzoyl-β-D-arabinofuranosyl) cytosin - 5'-yl 1-(2',3'-di-O-benzoyl-β-D-arabinofuranosyl)uracil-5'-yl phosphate; and 1-β-D-arabinofuranosylcytosin-5'-yl 1-β-D-arabinofuranosyluracil-5'-yl phosphate and its triethylammonium salt In the manner given in Example 57, N⁴-anisoyl-1-(2',3' - di-O-benzoyl-β-D-arabinofuranosyl)cytosine 5'-phosphate in pyridine solution was reacted with 1-(2',3'-di-O-benzoyl-β-D-arabinofuranosyl)uracil in the presence of dicyclohexyl carbodiimide to give N⁴-anisoyl-1-(2',3'-di-O-benzoyl-β-D-arabinofuranosyl)cytosin-5'-yl 1-(2',3'-di-O-benzoyl-β-D-arabinofuranosyl)uracil-5'-yl phosphate.

The thus-obtained ester product was hydrolyzed with ammonium hydroxide to give 1-β-D-arabinofuranosylcytosin-5'-yl 1-β-D-arabinofuranosyluracil-5'-yl phosphate which was recovered, as in Example 57, as the triethylammonium salt. The triethylammonium salt was treated with an acid exchange resin to give 1-β-D-arabinofuranosylcytosin - 5' - yl 1 - β - D-arabinofuranosyluracil-5'-yl phosphate.

EXAMPLE 59

N⁴ - anisoyl-1-(2',3'-di-O-benzoyl-β-D-arabinofuranosyl) cytosin - 5'-yl 1-(2',3'-di-O-benzoyl-β-D-arabinofuranosyl)thymin-5'-yl phosphate; and 1-β-D-arabinofuranosylcytosin - 5' - yl 1-β-D-arabinofuranosylthymin-5'-yl phosphate and its triethylammonium salt In the manner given in Example 57, N⁴-anisoyl-1-(2',3'-di-O-benzoyl-β-D-arabinofuranosyl)cytosine 5'-phosphate in pyridine solution was reacted with 1-(2',3'-di-O-benzoyl-β-D-arabinofuranosyl)thymine in the presence of dicyclohexylcarbodiimide to give N⁴-anisoyl-1-(2',3'-di-O-benzoyl-β-D-arabinofuranosyl)cytosin-5'-yl 1-(2',3'-di-O-benzoyl-β-D-arabinofuranosyl)thymin-5'-yl phosphate.

The thus-obtained ester product was hydrolyzed as shown in Example 57 with ammonium hydroxide to give 1-β-D-arabinofuranosylcytosin-5'-yl 1-β-D-arabinofuranosylthymin-5'-yl phosphate recovered as triethylammonium salt, which by treatment with an acid exchange resin gave 1 - β-D-arabinofuranosylcytosin-5'-yl 1-β-D-arabinofuranosylthymin-5'-yl phosphate.

EXAMPLE 60

N⁴ - anisoyl-1-(2',3'-di-O-benzoyl-β-D-arabinofuranosylcytosin - 5'-yl 1-(2',3'-di-O-benzoyl-β-D-arabinofuranosyl)5-fluorouracil-5'-yl phosphate; and 1-β-D-arabinofuranosylcytosin-5'-yl 1-β-D-arabinofuranosyl-5-fluorouracil-5'-yl phosphate and its triethylammonium salt In the manner given in Example 57, N⁴-anisoyl-1-(2',3'-di-O-benzoyl-β-D-arabinofuranosyl)cytosine 5'-phosphate in pyridine solution was reacted with 1-(2',3'-di-O-benzoyl-β-D-arabinofuranosyl)5-fluorouracil in the presence of dicyclohexylcarbodiimide to give N⁴-anisoyl-1-(2',3'-di - O-benzoyl-β-D-arabinofuranosyl)-cytosin-5'-yl 1-(2',3' - di - O-benzoyl-β-D-arabinofuranosyl)-5-fluorouracil-5'-yl phosphate.

The thus-obtained ester product was hydrolyzed with ammonium hydroxide, and consecutively treated with triethyl ammonium bicarbonate and then with an acid exchange resin, as in Example 57, to give 1-β-D-arabinofuranosylcytosin-5'-yl 1-β-D-arabinofuranosyl-5-fluorouracil-5'-yl phosphate.

EXAMPLE 61

N⁴ - anisoyl-1-(2',3'-di-O-benzoyl-β-D-arabinofuranosyl)-cytosin - 5' - yl N⁶-benzoyl-9-(2',3'-di-O-benzoyl-β-D-arabinofuranosyl)adenin-5'-yl phosphate; and 1-β-D-arabinofuranosylcytosin-5'-yl 9-β-D-arabinofuranosylaenin-5'-yl phosphate and its triethylammonium salt In the manner given in Example 57, N⁴-anisoyl-1-(2',3'-di-O-benzoyl-β-D-arabinofuranosyl)cytosine 5'-phosphate in pyridine solution was repeated with N⁶-benzoyl-1-(2',3'-di-O-benzoyl-β-D-arabinofuranosyl)adenine in the presence of dicyclohexylcarbodiimide to give N⁴-anisoyl-1-(2',3' - di-O-benzoyl-β-D-arabinofuranosyl)cytosin-5'-yl N⁶-benzoyl - 9 - (2',3'-di-O-benzoyl-β-D-arabinofuranosyl) adenin-5'-yl phosphate.

The thus-obtained ester product was hydrolyzed with ammonium hydroxide, the resulting product consecutively treated with triethylammonium bicarbonate and then with an acid exchange resin, as in Example 57, to give 1 - β - D - arabinofuranosylcytosin - 5' - yl 9 - β - D-arabinofuranosyladenin - 5' - yl phosphate.

EXAMPLE 62

N⁴ - anisoyl - 1 - (2',3' - di - O - benzoyl - β - D - arabinofuranosyl)cytosin - 5' - yl 9 - (2',3' - di - O - benzoyl-β - D - arabinofuranosyl)6 - mercaptopurin - 5' - yl phosphate; and 1 - β - D - arabinofuranosylcytosin-5' - yl 9 - β - D - arabinofuranosyl - 6 - mercaptopurin-5' - yl phosphate and its triethylammonium salt In the manner given in Example 57, N⁴-anisoyl-1-(2',3'-di - O - benzoyl - β - D - arabinofuranosyl)cytosine 5'-phosphate in pyridine solution was reacted with 9-(2',3' - di - O - benzoyl - β - D - arabinofuranosyl) - 6-mercaptopurine in the presence of dicyclohexylcarbodiimide to give N⁴ - anisoyl - 1 - (2',3' - di - O - benzoyl - β - D - arabinofuranosyl)cytosin - 5' - yl 9 - (2',3'-di - O - benzoyl - β - D - arabinofuranosyl) - 6 - mercaptopurine - 5' - yl phosphate.

The thus-obtained ester product was hydrolyzed with ammonium hydroxide, the resulting product consecutively treated with triethylammonium bicarbonate and then with an acid exchange resin, as in Example 57, to give 1 - β - D - arabinofuranosylcytosin - 5' - yl 9 - β - D-arabinofuranosyl) - 6 - mercaptopurin - 5' - yl phosphate.

EXAMPLE 63

N⁴-anisoyl - 1 - (2',3' - di - O - benzoyl - β - D - arabinofuranosyl)cytosin - 5' - yl 1 - (2',3' - di - O - benzoyl-β - D - arabinofuranosyl)5 - chlorouracil - 5' - yl phosphate; and 1 - β - D - arabinofuranosylcytosin - 5' - yl 1 - β - D - arabinofuranosyl - 5 - chlorouracil - 5' - yl phosphate and its triethylammonium salt In the manner shown in Example 57, N⁴ - anisoyl - 1-(2,'3' - di - O - benzoyl - β - D - arabinofuranosyl)cytosine 5' - phosphate in pyridine solution was reacted with 1-(2',3' - di - O - benzoyl - β - D - arabinofuranosyl)-5 - chlorouracil in the presence of dicyclohexylcarbodiimide to give N⁴ - anisoyl - 1 - (2',3' - di - O - benzoyl - β - D - arabinofuranosyl) - cytosin - 5' - yl 1 - 2',3'-di - O - benzoyl - β - D - arabinofuranosyl) - 5 - chlorouracil - 5' - yl phosphate.

The thus-obtained ester product was hydrolyzed with ammonium hydroxide, the thus-obtained product consecutively treated with triethylammonium bicarbonate and then with an acid exchange resin, as in Example 57, to give 1 - β - D - arabinofuranosylcytosin - 5'-yl 1-β-D-arabinofuranosyl - 5 - chlorouracil - 5' - yl phosphate.

EXAMPLE 64

N⁴ - anisoyl - 1(2',3' - di - O - benzoyl - β - D - arabinofuranosyl)cytosin - 5' - yl, 1 - (2',3' - di - O - benzoyl-β - D - arabinofuranosyl)cytosin - 5' - yl phosphate and 1 - β - D - arabinofuranosylcytosin - 5' - yl 1 - β-D - arabinofuranosylcytosin - 5' - yl phosphate and its triethylamine salt In the manner given in Example 55, $N^4$ - anisoyl - 1-(2',3' - di - O - benzoyl - β - D - arabinofuranosyl)cytosin 5' - phosphate in pyridine solution was reacted with 1 - (2',3' - di - O - benzoyl - β - D - arabinofuranosyl)-cytosin in the presence of dicyclohexylcarbodiimide to give $N^4$ - anisoyl - 1 - (2',3' - di - O - benzoyl - β - D-arabinofuranosyl)cytosin - 5' - yl 1 - (2',3' - di - O - benzoyl - β - D - arabinofuranosyl)cytosin - 5' - yl phosphate.

The thus-obtained ester product was hydrolyzed with ammonium hydroxide to give 1 - β - D - arabinofuranosylcytosin - 5' - yl 1 - β - D - arabinofuranosylcytosin-5' - yl phosphate which was recovered, as in Example 55, as triethylamine salt. The triethylamine salt was treated with an acid exchange resin to give 1-β-D-arabinofuranosylcytosin - 5' - yl 1 - β - D - arabinofuranosylcytosin - 5' - yl phosphate.

I claim:

1. 1 - β - D - arabinofuranosylcytosin - 5' - yl 1 - β - D-arabinofuranosyluracil - 5' - yl phosphate.

2. 1 - β - D - arabinofuranosylcytosin - 5' - yl 1 - β - D-arabinofuranosylthymin - 5' - yl phosphate.

3. 1 - β - D - arabinofuranosylcytosin - 5' - yl 9 - β - D-arabinofuranosyladenin - 5' - yl phosphate.

4. 1 - β - D - arabinofuranosyl - 5 - fluorouracil - 5' - yl 1 - β - D - arabinofuranosylcytosin - 5' - yl phosphate.

5. $N^4$ - anisoyl - 1 - (2',3' - di - O - benzoyl - β - D-arabinofuranosyl)cytosin - 5' - yl 9 - (2',3' - di - O - benzoyl-β-D-arabinofuranosyl)-6-mercaptopurin-5'-yl phosphate.

References Cited

UNITED STATES PATENTS

| | | | |
|---|---|---|---|
| 3,208,997 | 9/1965 | Iwai et al. | 260—211.5 |
| 3,284,440 | 11/1966 | Patchett et al. | 260—211.5 |

LEWIS GOTTS, Primary Examiner

JOHNNIE R. BROWN, Assistant Examiner

U.S. Cl. X.R.

260—999

UNITED STATES PATENT OFFICE
CERTIFICATE OF CORRECTION

Patent No. 3,457,253　　　　　　　　Dated July 22, 1969

Inventor(s) William J. Wechter

It is certified that error appears in the above-identified patent and that said Letters Patent are hereby corrected as shown below:

Column 9, line 66, for "tripenylchloromethane" read -- triphenylchloromethane --; line 71, for "arabinofuranoyl)" read -- arabinofuranosyl) --. Column 10, line 12, for "9-[5'-O-(p-methoxyphenyl)diphenylmethyl-$\beta$-D-adenine" read -- 9-(5'-O-triphenylmethyl-$\beta$-D-arabinofuranosyl)adenine --. Column 12, line 24, for "chloide" read -- chloride --; line 26, for "(2',3"-di-O-lauryl" read -- (2',3'-di-O-lauroyl --. Column 14, line 7, for "(5',O-" read -- (5'-O- --. Column 15, line 69, for "eher" read -- ether --. Column 16, line 4, for "propinoyl" read -- propionyl --; line 20, for "wtih" read -- with --; line 68, for "(2'-3-" read -- (2',3'- --; line 75, for "arabinofuransy)" read -- arabinofuranosyl) --; line 75, for "(2'3-" read -- (2',3'- --. Column 17, line 2, for "-$\beta$D-" read -- -$\beta$-D- --; line 4, for "aribin-" read -- arabin- --; line 9, for "arabinofuransoyl" read -- arabinofuranosyl --. Column 18, line 10, for "50-x8" read -- 50 x 8 --; lines 55 and 56 for "isopropyl acyl group connected to the amino group of the cytosine column" read -- isopropyl alcohol in a 2:5 ratio, then absorbed onto a cellulose column --. Column 19, line 7, for "phosphate" read -- phosphate. --; line 37, for "$N^4$-lauroyl-anisoyl" read -- $N^4$-anisoyl--. Column 22, line 15, for "arbinofuranosyl" read -- arabinofuranosyl --. Column 23, line 60, for "evaporaed" read -- evaporated --. Column 26, lines 5 and 6 for "arabinofuranosylaenin" read -- arabinofuranosyladenin --; line 10, for "repeated" read -- reacted --.

SIGNED AND
SEALED
JAN 26 1971

(SEAL)
Attest:

Edward M. Fletcher, Jr.
Attesting Officer

WILLIAM E. SCHUYLER, JR
Commissioner of Patents